United States Patent
Koike et al.

(10) Patent No.: US 12,196,257 B2
(45) Date of Patent: Jan. 14, 2025

(54) BEARING DEVICE, SPINDLE DEVICE, BEARING AND SPACER

(71) Applicant: NTN CORPORATION, Osaka (JP)

(72) Inventors: Takashi Koike, Iwata (JP); Yasuyuki Fukushima, Iwata (JP); Yusuke Shibuya, Iwata (JP); Daichi Kondou, Iwata (JP)

(73) Assignee: NTN CORPORATION, Osaka (JP)

( * ) Notice: Subject to any disclaimer, the term of this patent is extended or adjusted under 35 U.S.C. 154(b) by 149 days.

(21) Appl. No.: 17/787,047

(22) PCT Filed: Dec. 8, 2020

(86) PCT No.: PCT/JP2020/045593
§ 371 (c)(1),
(2) Date: Jun. 17, 2022

(87) PCT Pub. No.: WO2021/131662
PCT Pub. Date: Jul. 1, 2021

(65) Prior Publication Data
US 2023/0027711 A1    Jan. 26, 2023

(30) Foreign Application Priority Data

Dec. 23, 2019    (JP) .................................. 2019-231814

(51) Int. Cl.
*F16C 19/52*    (2006.01)
*F16C 19/54*    (2006.01)
(Continued)

(52) U.S. Cl.
CPC .......... *F16C 19/522* (2013.01); *F16C 19/548* (2013.01); *F16C 35/12* (2013.01); *G01L 5/0019* (2013.01)

(58) Field of Classification Search
CPC ........ F16C 19/52; F16C 19/522; F16C 35/12; F16C 2229/00; F16C 2233/00; G01L 5/0019
See application file for complete search history.

(56) References Cited

U.S. PATENT DOCUMENTS

| | | |
|---|---|---|
| 5,785,432 A | 7/1998 | Miyakazki |
| 6,000,855 A | 12/1999 | Miyakazki |
| (Continued) | | |

FOREIGN PATENT DOCUMENTS

| | | | |
|---|---|---|---|
| DE | 102009005888 A1 | 7/2010 | |
| DE | 112008002878 T5 * | 12/2010 | ............. B23Q 17/22 |
| (Continued) | | | |

OTHER PUBLICATIONS

Translation of DE-112008002878-T5 obtained Jan. 11, 2024.*
International Search Report received in PCT Application No. PCT/JP2020/045593, dated Mar. 9, 2021, with English translation.

*Primary Examiner* — James Pilkington
(74) *Attorney, Agent, or Firm* — Rimon P.C.

(57) ABSTRACT

A bearing device includes: at least one bearing that has a rolling element and a raceway surface to support a main shaft; a member disposed on a path through which pressing force generating a preload between the rolling element and the raceway surface is transmitted; and at least one load sensor element fixed to the member to measure the pressing force. At least one load sensor element is a chip component including a thin film pattern of which resistance changes according to the pressing force and a protective layer that insulates and protects thin film pattern.

12 Claims, 14 Drawing Sheets

(51) Int. Cl.
*F16C 35/12* (2006.01)
*G01L 5/00* (2006.01)

(56) References Cited

U.S. PATENT DOCUMENTS

| | | |
|---|---|---|
| 2003/0164050 A1 | 9/2003 | Chinitz et al. |
| 2006/0243068 A1 | 11/2006 | Ueno et al. |
| 2007/0014500 A1* | 1/2007 | Iwamoto ................. F16C 43/04 |
| | | 384/544 |
| 2007/0098311 A1 | 5/2007 | Iwamoto et al. |
| 2012/0128287 A1 | 5/2012 | Zaaijer et al. |
| 2019/0010987 A1 | 1/2019 | Chang |

FOREIGN PATENT DOCUMENTS

| | | | |
|---|---|---|---|
| DE | 102015217139 A1 | 3/2017 | |
| JP | S60-227140 A | 11/1985 | |
| JP | H09-229059 A | 9/1997 | |
| JP | 2005-265175 A | 9/2005 | |
| JP | 2007-032705 A | 2/2007 | |
| JP | 2007-271005 A | 10/2007 | |
| JP | 2008-286219 A | 11/2008 | |
| JP | 2008-298583 A | 12/2008 | |
| JP | 2009-115284 A | 5/2009 | |
| JP | 2010-180982 A | 8/2010 | |
| JP | 2011167799 A * | 9/2011 | |
| JP | 2012-108025 A | 6/2012 | |
| KR | 10-2010-0075578 A | 7/2010 | |
| WO | WO-2020075638 A1 * | 4/2020 | ............ F16C 19/522 |

\* cited by examiner

BEARING DEVICE, SPINDLE DEVICE, BEARING AND SPACER

CROSS-REFERENCE OF RELATED APPLICATIONS

This application is the U.S. National Phase under 35 U.S.C. § 371 of International Patent Application No. PCT/JP2020/045593, filed on Dec. 8, 2020, which in turn claims the benefit of Japanese Application No. 2019-231814, filed on Dec. 23, 2019, the entire disclosures of which Applications are incorporated by reference herein.

TECHNICAL FIELD

The present invention relates to a bearing device including a preload sensor that detects a preload of a bearing used for a main spindle or the like of a machine tool, a spindle device, a bearing, and a spacer.

BACKGROUND ART

In a spindle device of a machine tool or the like, preload management of a bearing is required in order to improve processing accuracy and efficiency, and thus there is a demand for detecting a preload (load) of the bearing. There is also a demand for detecting a sign of an abnormality before the abnormality is generated in the bearing to prevent the abnormality of the bearing.

In Japanese Patent Laying-Open No. 2008-286219 (PTL 1), in a bearing device in which a spacer is interposed between a plurality of rolling bearings arranged in an axial direction, a part of the spacer is made of a magnetostrictive material, at least a part of a remaining portion of the spacer except for the part made of the magnetostrictive material is made of a nonmagnetic material, and a preload of the bearing is detected from a change in magnetic characteristic of the portion of the magnetostrictive material.

CITATION LIST

Patent Literature

PTL 1: Japanese Patent Laying-Open No. 2008-286219

SUMMARY OF INVENTION

Technical Problem

In the bearing device disclosed in Japanese Patent Laying-Open No. 2008-286219 (PTL 1), the magnetostrictive material is sandwiched between a pair of spacers obtained by dividing an outer-ring spacer into two. For this reason, a structure is complicated, and the pair of spacers is required to be put in a housing while held so as not to be separated, and it is difficult to assemble the bearing device.

In addition, in the preload detection using the magnetostrictive material, reduction of temperature drift, hysteresis, and the like of an output signal become a problem in addition to selection of the magnetostrictive material.

The present invention has been made to solve the above problems, and an object of the present invention is to provide a bearing device including a preload sensor that detects a preload of a bearing with a simple configuration, a spindle device, a bearing, and a spacer.

Solution to Problem

The present disclosure relates to a bearing device. A bearing device includes at least one bearing including a rolling element and a raceway surface to support a shaft, a member disposed on a path through which pressing force generating a preload is transmitted between the rolling element and the raceway surface, and at least one load sensor element fixed to the member to measure the pressing force. The at least one load sensor element includes a thin film pattern of which resistance changes according to the pressing force and a protective layer that insulates and protects the thin film pattern.

Preferably, the pressing force is applied by a load in a direction along the shaft. The at least one load sensor element is a plurality of load sensor elements arranged at equal intervals on a circumference in a plane intersecting the direction along the shaft.

Preferably, the at least one bearing is a plurality of bearings. The member is a non-rotating-side spacer inserted between two bearings of the plurality of bearings. The at least one load sensor element is fixed to an end face of the spacer, and abuts on a fixed ring of one of the two bearings to transmit the pressing force.

Preferably, the member is a fixed ring of the at least one bearing, and the at least one load sensor element is fixed to an end face of the fixed ring, and abuts on an end face of a spacer disposed adjacent to the fixed ring to transmit the pressing force.

Preferably, the member is a first spacer obtained by dividing a spacer disposed adjacent to the at least one bearing into the first spacer and a second spacer. The at least one load sensor element is fixed to an end face of the first spacer, and abuts on an end face of the second spacer to transmit the pressing force.

Preferably, the bearing device further includes a processing unit that is disposed near the at least one load sensor element to process output of the at least one load sensor element. The processing unit includes an amplifier that detects and amplifies a resistance change of the at least one load sensor element.

Preferably, the bearing device further includes a processing unit that is disposed near the at least one load sensor element to process output of the at least one load sensor element. The at least one load sensor element is a plurality of load sensor elements. The processing unit includes a plurality of amplifiers that process outputs of the plurality of load sensor elements, an arithmetic unit, and a storage. The arithmetic unit calculates a load from a sensor output representative value including at least one of an addition value, an average value, a maximum value, a minimum value, and a difference between the maximum value and the minimum value of output values obtained by the plurality of amplifiers; a relationship between a load stored in advance in the storage and the sensor output representative value; or an approximate expression of the relationship.

Preferably, the member is one of a first outer-ring spacer and a second outer-ring spacer that are obtained by dividing a spacer disposed adjacent to the at least one bearing into two. The first outer-ring spacer and the second outer-ring spacer sandwich the at least one load sensor element. The first outer-ring spacer and the second outer-ring spacer are fastened by a screw, and pressing force by fastening force of the screw is applied in advance to the at least one load sensor element.

Preferably, the member is one of a first outer-ring spacer and a second outer-ring spacer that are obtained by dividing a spacer disposed adjacent to the at least one bearing into two. The first outer-ring spacer and the second outer-ring spacer sandwich the at least one load sensor element. A sandwiching surface that sandwiches the at least one load sensor element of the first outer-ring spacer and the second outer-ring spacer is a flat surface having no protrusion.

More preferably, the bearing device further includes an oil seal member disposed between the first outer-ring spacer and the second outer-ring spacer of the spacer.

Preferably, the member is one of a first spacer and a second spacer that are obtained by dividing the spacer disposed adjacent to the at least one bearing into two. The first spacer and the second spacer sandwich the at least one load sensor element, a convex portion in which the position of the second spacer is limited is formed in the first spacer, and a concave portion fitted to the convex portion is formed in the second spacer.

In another aspect, the present disclosure relates to a spindle device including the bearing device according to any one of the above.

In still another aspect, the present disclosure relates to a hearing. The bearing includes a rolling element, an inner ring, an outer ring, and at least one load sensor element that is disposed on an end face of a fixed ring of the inner ring and the outer ring to measure pressing force generating a preload between the rolling element and a raceway surface. The at least one load sensor element includes a thin film pattern of which resistance changes according to the pressing force and a protective layer that insulates and protects the thin film pattern.

Preferably, the bearing further includes a processing unit that processes output of the at least one load sensor element. The processing unit is integrally mounted on the fixed ring.

In yet another aspect, the present disclosure relates to a spacer disposed adjacent to a bearing including a rolling element and a raceway surface. The spacer includes a member to which pressing force generating a preload between the rolling element and the raceway surface is transmitted and at least one load sensor element that is fixed to the member to measure the pressing force. The at least one load sensor element includes a thin film pattern of which resistance changes according to the pressing force and a protective layer that insulates and protects the thin film pattern.

Preferably, the spacer further includes a processing unit that is integrally mounted on the member to process output of the at least one load sensor element.

Preferably, the member is a first spacer obtained by dividing the spacer into the first spacer and a second spacer. The at least one load sensor element is fixed to an end face of the first spacer, and abuts on an end face of the second spacer to transmit the pressing force.

Preferably, the first spacer and the second spacer sandwich the at least one load sensor element. The first spacer and the second spacer are fastened by a screw. Pressing force by fastening force of the screw is applied in advance to the at least one load sensor element.

More preferably, the spacer further includes an oil seal member disposed between the first spacer and the second spacer.

More preferably, a step that enables alignment of the first spacer and the second spacer is formed on an inner diameter portion side of the first spacer and the second spacer by fitting with the oil seal member.

Preferably, the member is one of the first spacer and the second spacer that are obtained by dividing the spacer disposed adjacent to the bearing into two. The first spacer and the second spacer sandwich the at least one load sensor element, a convex portion in which the position of the second spacer is limited is formed in the first spacer, and a concave portion fitted to the convex portion is formed in the second spacer.

ADVANTAGEOUS EFFECTS OF INVENTION

According to the present invention, the bearing device including the preload sensor that detects the preload of the bearing with the simple configuration, the spindle device, the bearing, and the spacer can be implemented, and maintenance and management of the bearing can be easily performed.

DESCRIPTION OF EMBODIMENT

Figure 1:
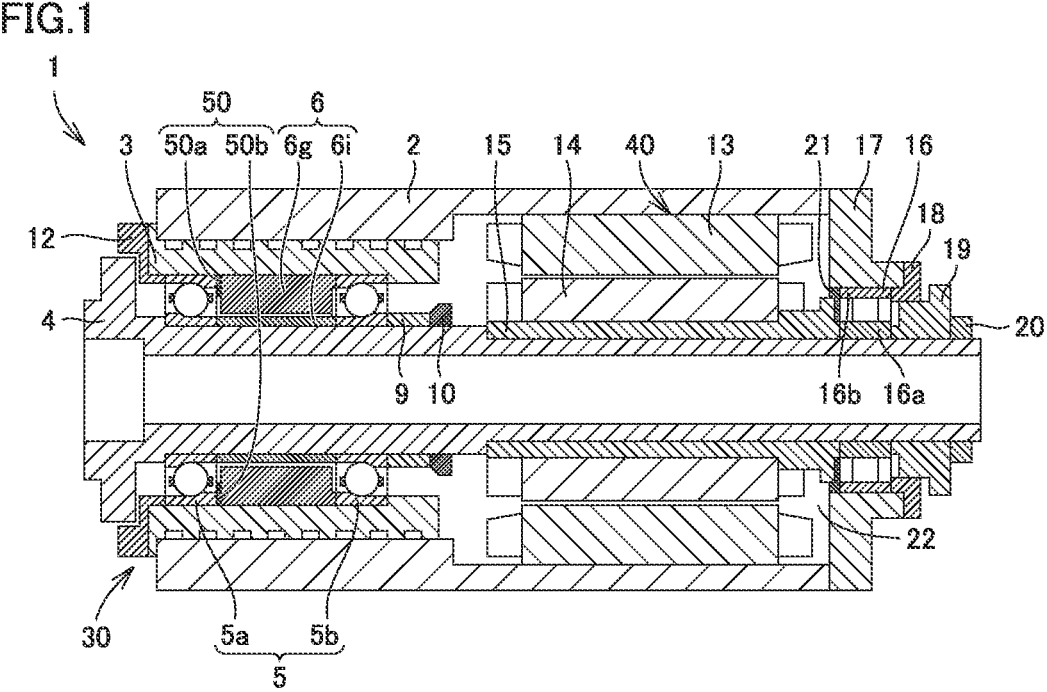
FIG. 1 is a sectional diagram illustrating a schematic configuration of a spindle device according to an embodiment.

With reference to the drawings, an embodiment of the present invention will be described below. In the following drawings, the same or corresponding component is designated by the same reference numeral, and the overlapping description will be omitted.

Figure 2:
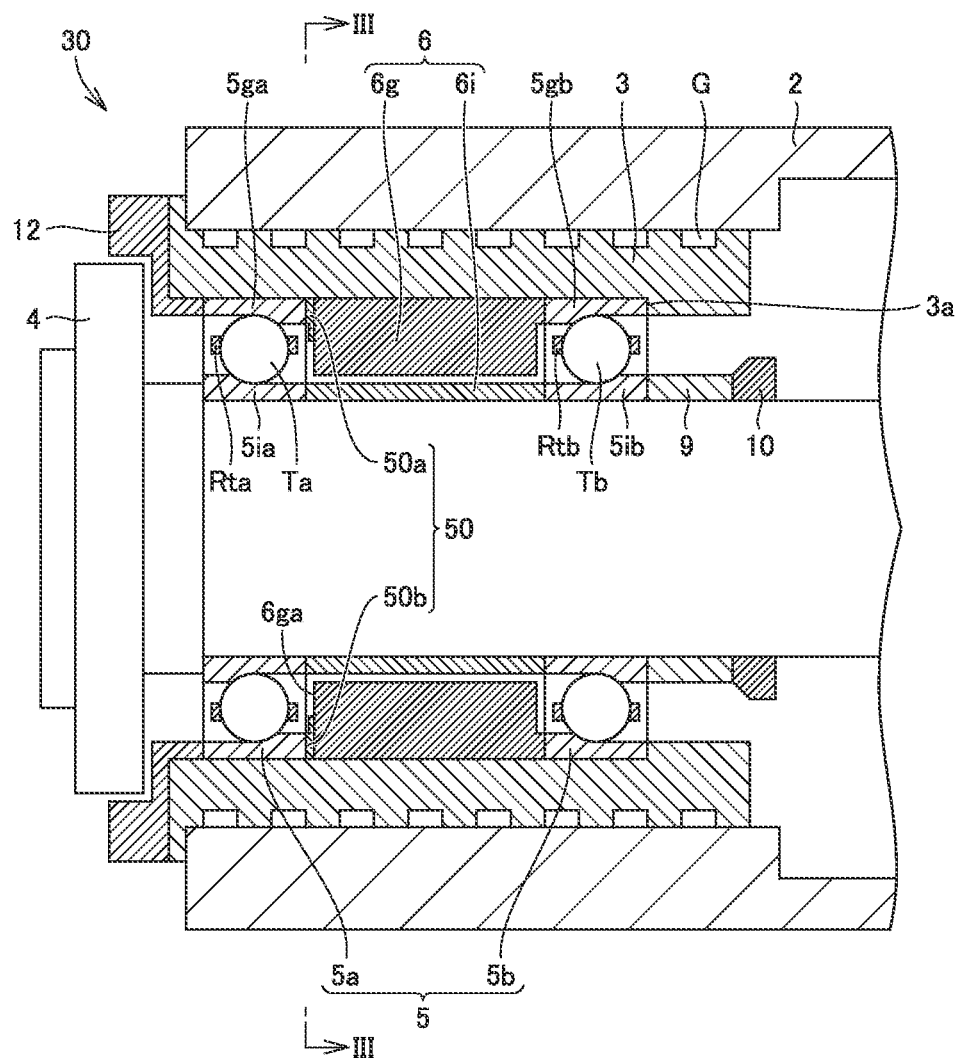
FIG. 2 is an enlarged view of a left side main portion in FIG. 1.

FIG. 1 is a sectional diagram illustrating a schematic configuration of a spindle device according to an embodiment. FIG. 2 is an enlarged view of a left side main portion in FIG. 1. FIG. 2 mainly illustrates a bearing device 30.

For example, a spindle device 1 in FIG. 1 is used as a built-in motor type spindle device of a machine tool. In this case, a motor 40 is incorporated on one end side of a main shaft 4 supported by spindle device 1 for a machine tool spindle, and a cutting tool such as an end mill (not illustrated) is connected to the other end side.

With reference to FIGS. 1 and 2, spindle device 1 includes bearings 5a, 5b, spacer 6 disposed adjacent to bearings 5a, 5b, motor 40, and a bearing 16 disposed behind the motor. Main shaft 4 is rotatably supported by the plurality of bearings 5a, 5b provided in a housing 3 embedded in an inner diameter portion of an outer cylinder 2. Bearing 5a includes an inner ring 5ia, an outer ring 5ga, a rolling element Ta, and a retainer Rta. Bearing 5b includes an inner ring 5ib, an outer ring 5gb, a rolling element Tb, and a retainer Rtb. Spacer 6 includes an inner-ring spacer 6i and an outer-ring spacer 6g.

A load sensor element (pressure-sensitive sensor element) 50 is fixed to one end face 6ga of outer-ring spacer 6g by adhesion or the like. In the case of fixing by the adhesion, an adhesive having excellent oil resistance and heat resistance is desirably used, Inner ring 5ia of bearing 5a and inner ring 5ib of bearing 5b, which are separated in an axial direction, are fitted to main shaft 4 in an interference fit state (press-fitted state). Inner-ring spacer 6i is disposed between inner rings 5ia, 5ib, and outer-ring spacer 6g is disposed between outer rings 5ga, 5gb.

Bearing 5a is a rolling bearing in which a plurality of rolling elements Ta are disposed between inner ring 5ia and outer ring 5ga. These rolling elements Ta are spaced by retainer Rta. Bearing 5b is a rolling bearing in which a plurality of rolling elements Tb are disposed between inner ring 5ib and outer ring 5gb. These rolling elements Tb are spaced by retainer Rtb.

Bearings 5a, 5b are bearings capable of applying a preload by force in an axial direction, and an angular ball bearing, a deep groove ball bearing, a tapered roller bearing, or the like can be used. The angular ball hearing is used as bearing device 30 in FIG. 2, and two bearings 5a, 5b are installed in a back-surface combination (DB combination).

In this case, a structure in which main shaft 4 is supported by three bearings 5a, 5b, 16 will be described as an example, and a structure in which main shaft 4 is supported by at least three bearings may be used.

Single-row rolling bearing 16 is a cylindrical roller bearing. A radial load and an axial load that act on spindle device 1 are supported by bearings 5a, 5b that are angular ball bearings. A radial load acting on spindle device 1 for the machine tool spindle is supported by single-row beating 16 that is the cylindrical roller bearing, A cooling medium passage G is formed in housing 3. Bearings 5a, 5b can be cooled by allowing a cooling medium to flow between housing 3 and outer cylinder 2.

A lubricating oil supply passage is not required when a grease lubrication bearing is used as bearings 5a, 5b, and the lubricating oil supply passage is provided in outer-ring spacer 6g when lubrication of air oil or the like is required. At this point, the lubricating oil supply passage is not illustrated.

At the time of assembly, first, bearing 5a, spacer 6, bearing 5b, and spacer 9 are sequentially inserted into main shaft 4, and an initial preload is applied by tightening a nut 10. Then, main shaft 4 to which bearings 5a, 5b are attached is inserted into housing 3 until a right side of outer ring 5gb of bearing 5b in FIG. 2 hits a step 3a provided in housing 3. Finally, a front lid 12 pushes outer ring 5ga of left bearing 5a to fix main shaft 4 to housing 3.

When nut 10 is tightened, the force acts on the end face of inner ring 5ib of hearing 5b through spacer 9, and inner ring 5ib is pushed toward inner-ring spacer 6i. This force is transmitted to inner ring 5ib, rolling element Tb, and outer ring 5gb to apply the preload between raceway surfaces of inner ring 5ib and outer ring 5gb and rolling element Tb, and also transmitted from outer ring 5gb to outer-ring spacer 6g. Pressing force acts on outer-ring spacer 6g from right outer ring 5gb, and force is also transmitted to load sensor element 50.

This force is transmitted to outer ring 5ga, rolling element Ta, and inner ring 5ia in bearing 5a, and also applies the preload between the raceway surfaces of inner ring 5ia and outer ring 5ga of left bearing 5a and rolling element Ta. The preload applied to bearings 5a, 5b is determined by, for example, a movement amount restricted by a dimensional difference between widths of outer-ring spacer 6g and inner-ring spacer 6i.

In single-row hearing 16 of FIG. 1, an inner ring 16a is positioned in the axial direction by a cylindrical member 15 fitted to an outer periphery of main shaft 4 and an inner-ring retainer 19. Inner-ring retainer 19 is prevented from coming off by a nut 20 screwed to main shaft 4. An outer ring 16b of hearing 16 is sandwiched between a positioning member 21 fixed to cylindrical member 15 and a positioning member 18 fixed to inner-ring retainer 19, and slides integrally with inner ring 16a with respect to an end member 17 in accordance with expansion and contraction of main shaft 4.

Motor 40 that drives main shaft 4 is disposed at an intermediate position in the axial direction sandwiched between bearings 5a, 5b and single-row bearing 16 in a space portion 22 formed between main shaft 4 and outer cylinder 2. A rotor 14 of motor 40 is fixed to cylindrical member 15 fitted to the outer periphery of main shaft 4, and a stator 13 of motor 40 is fixed to an inner peripheral portion of outer cylinder 2.

The cooling medium passage for cooling motor 40 is not illustrated here.

Load sensor element 50 measuring the preload (load) of hearing 5 (5a, 5b) is mounted on a preload path of spindle device 1. As illustrated in FIG. 2, load sensor element 50 is fixed to end face 6ga of outer-ring spacer 6g by the adhesion or the like, abuts on the end face of outer ring 5ga of bearing 5a, and measures the preload applied to bearing 5 (5a, 5b).

When the output of load sensor element 50 is observed at the time of assembling spindle device 1, whether the preload is set in advance can be checked, and the number of assembling steps can be reduced. In addition, a preload amount increased by thermal expansion due to heat generation during operation can be known when the output of load sensor element 50 is observed during, the operation of the machine tool. When a preload change during the operation is observed, degradation of cutting performance and seizure of bearing 5 can be prevented in advance.

For example, load sensor element 50 is a pressure-sensitive sensor including a thin film pattern (thin film resistor) that measures a load (preload) from a change in electric resistance, and is disposed on the path through which pressing force generating the preload is transmitted.

Figure 3:
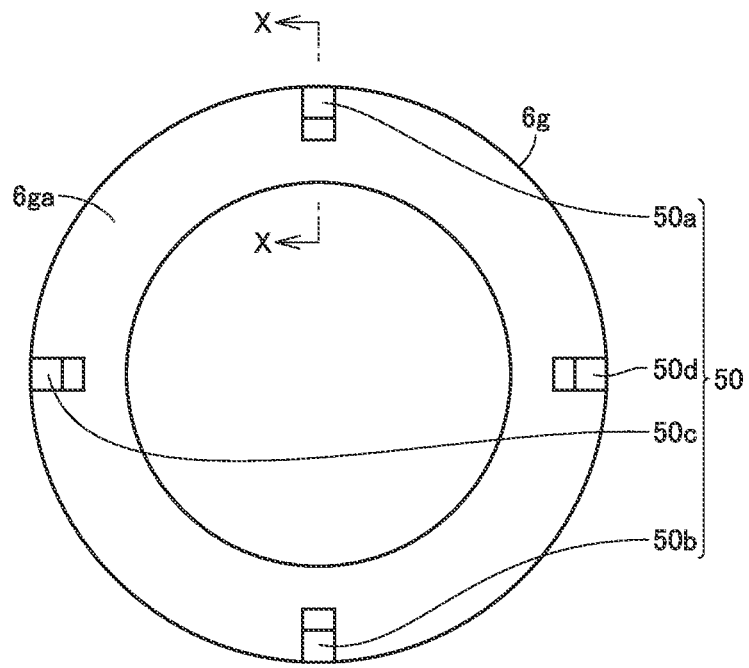
FIG. 3 is a view illustrating a first arrangement example of a load sensor element taken along a line III-III in FIG. 2.
Figure 4:
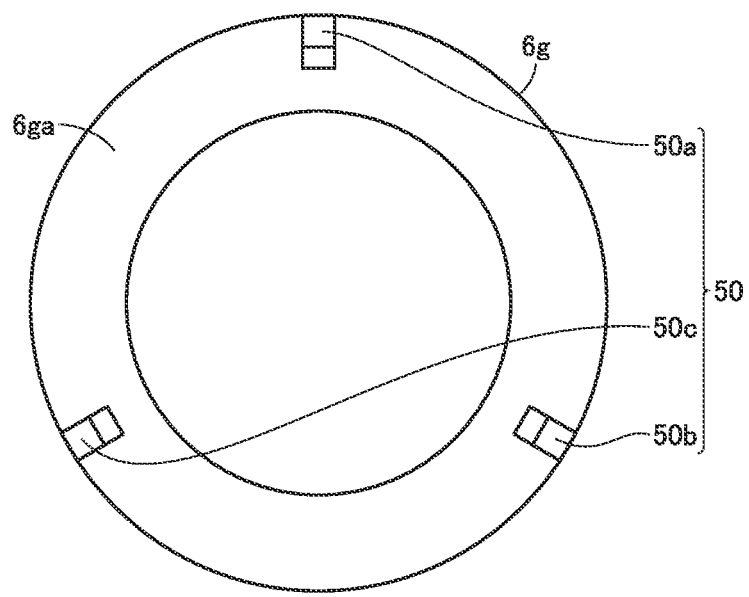
FIG. 4 is a view illustrating a second arrangement example of the load sensor element taken along the line III-III in FIG. 2.

FIG. 3 is a view illustrating a first arrangement example of the load sensor element taken along a line III-III in FIG. 2. FIG. 4 is a view illustrating a second arrangement example of the load sensor element taken along the in FIG. 2. In FIGS. 3 and 4, components unnecessary for the description are omitted.

FIG. 3 illustrates the arrangement example of load sensor element 50 mounted on end face 6ga of outer-ring spacer 6g. In this case, load sensor elements 50a, 50b, 50c, 50d are arranged at equal intervals of 90 degrees in a circumferential direction of outer-ring spacer 6g.

In the example of FIG. 4, load sensor elements 50a, 50b, 50c are arranged at equal intervals of 120 degrees in the circumferential direction of outer-ring spacer 6g.

The number of load sensor elements 50 is preferably at least 3 as long as the end face of outer ring 5ga can be uniformly pressed with good balance through load sensor elements 50. In addition, load sensor elements 50 are preferably arranged at equal intervals on substantially the same circumference.

Figure 5:
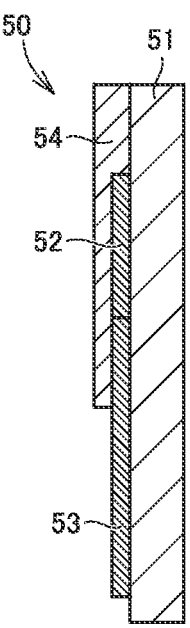
FIG. 5 is a sectional view illustrating a load sensor element 50 taken along a line X-X in FIG. 3.
Figure 6:
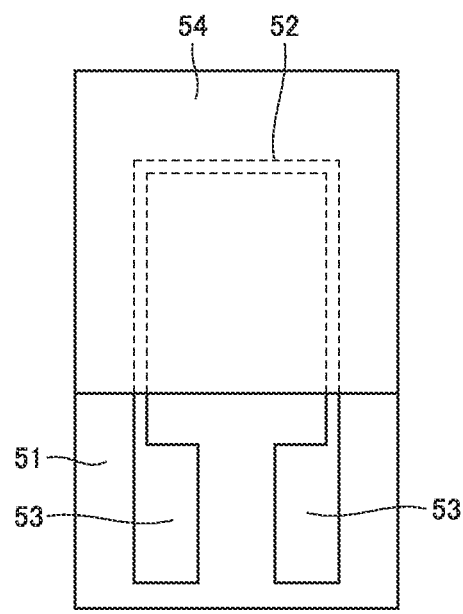
FIG. 6 is a front view illustrating load sensor element 50 in FIG. 5.

With reference to FIGS. 5 and 6, the structure of the load sensor element will be described below. FIG. 5 is a sectional view illustrating load sensor element 50 taken along a line X-X in FIG. 3. FIG. 6 is a front view illustrating load sensor element 50 in FIG. 5.

Load sensor element 50 includes a substrate 51 having an insulating property, a thin film pattern (thin film resistor) 52 disposed on substrate 51 to change resistance with a change in surface pressure, an electrode 53 connected to thin film pattern 52, and a protective layer 54 having the insulating property protecting thin film pattern 52. Because protective layer 54 is not formed on electrode 53, wiring can be directly connected to electrode 53.

For example, a ceramic material containing mainly zirconia ($ZrO_2$) or alumina ($Al_2O_3$) is used for substrate 51. The ceramic material has high rigidity and high insulating property, and can process the surface flatness of substrate 51 with high accuracy, which is advantageous. For example, a thickness of substrate 51 is preferably greater than or equal to 0.3 mm and less than or equal to 5 mm from the viewpoint of reducing the thickness of load sensor element 50 and securing strength in a compression direction.

For example, thin film pattern 52 is made of nickel chromium (NiCr) or chromium (Cr)-based material, and formed by vapor deposition, sputtering, or the like. For example, the thickness of the thin film pattern is less than or equal to 1 μm. In addition, protective layer 54 is made of an insulating material, and for example, a thin film of alumina ($Al_2O_3$) or silicon dioxide ($SiO_2$) is formed by sputtering or the like. For example, the film thickness of protective layer 54 is about 2 μm.

The surface of electrode 53 may be coated with a material such as copper, silver, or gold to facilitate soldering with the wiring.

An upper surface of substrate 51 on which thin film pattern 52 is formed may be polished so as to have flatness less than or equal to 1 μm. In addition, parallelism between the upper surface and the lower surface of substrate 51 is preferably less than or equal to 1 μm.

As described above, load sensor element 50 on which thin film pattern 52 is formed is fixed to outer-ring spacer 6g by the adhesion or the like, so that it is easier to manufacture than directly forming the thin film pattern on outer-ring spacer 6g.

The load applied to outer-ring spacer 6g is divided by the contact area of load sensor element 50 abutting on the end face of outer ring 5ga of bearing 5a. In the above-described example, because the applied load is divided by the total area of each load sensor element 50 abutting on protective layer 54, the sensitivity of load detection is increased when the contact area with protective layer 54 is reduced. However, the shape of load sensor element 50 is set in consideration of each material physical property value of load sensor element 50. In this case, the shape of load sensor element 50 is rectangular. However, the shape is not limited thereto.

Figure 7:
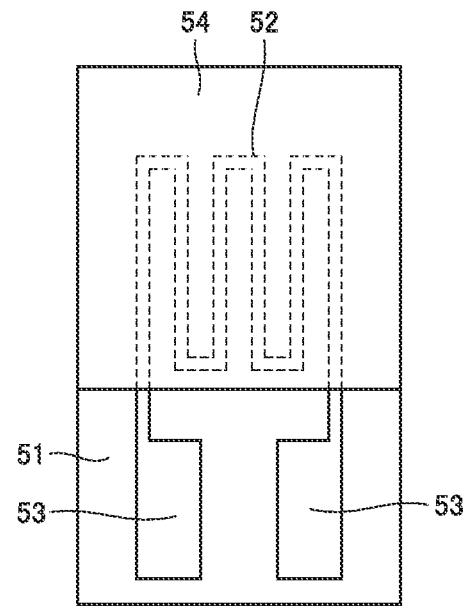
FIG. 7 is a view illustrating a modification of a shape of a thin film pattern.

FIG. 7 is a view illustrating a modification of the shape of the thin film pattern. Thin film pattern 52 has a U-shape in the example of FIG. 6, but may be a continuous rectangular pattern as illustrated in FIG. 7, and the shape of thin film pattern 52 is not limited thereto. When the continuous rectangular pattern is formed on substrate 51, a pressure-sensitive area is widened, and the load can be stably detected.

Figure 8:
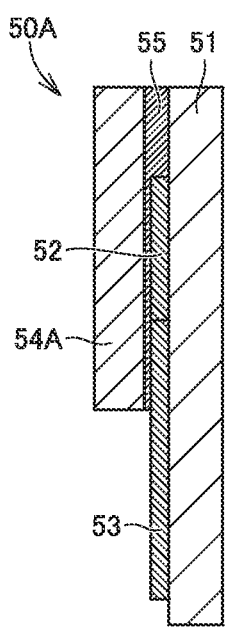
FIG. 8 is a view illustrating a first improvement example of a structure of the load sensor element.

FIG. 8 is a view illustrating a first improvement example of the structure of the load sensor element. In FIG. 5, protective layer 54 is the thin film made of the insulating material and formed by vapor deposition or sputtering, but in a load sensor element 50A of FIG. 8, for example, a plate material made of a ceramic material containing mainly zirconia ($ZrO_2$) or alumina. ($Al_2O_3$) is used as a protective layer 54A. Protective layer 54A is bonded and fixed so as to cover thin film pattern 52 formed on the surface of substrate 51 through an adhesive layer 55 made of the adhesive. For example, the thickness of protective layer 54A is about 0.3 mm to about 5 mm, which is the same as the thickness of substrate 51.

When the plate material made of the insulating material is used as protective layer 54A, manufacturing is facilitated as compared with the film formation of protective layer 54 by sputtering or the like. In addition, the insulation between thin film pattern 52 and outer ring 5ga can be further enhanced, and the load can be stably detected. In addition, because thin film pattern 52 is pressed through adhesive layer 55, adhesive layer 55 serves as a cushion layer and can uniformly press thin film pattern 52, so that load detection accuracy is improved.

Figure 9:
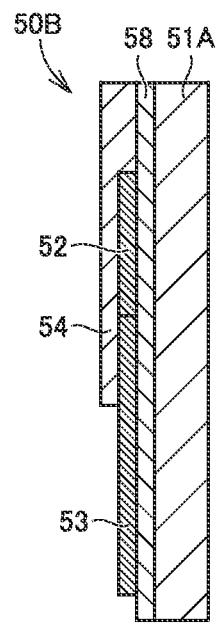
FIG. 9 is a view illustrating a second improvement example of the structure of the load sensor element.

FIG. 9 is a view illustrating a second improvement example of the structure of the load sensor element. In FIGS. 5 and 8, the insulating material is used as substrate 51. In a load sensor element 50B of FIG. 9, a metal material is used as a substrate 51A, and an insulating layer 58 is formed on the surface of substrate 51A. For example, insulating layer 58 is made of the insulating material, and the thin film of alumina ($Al_2O_3$) or silicon dioxide ($SiO_2$) is formed by sputtering or the like. For example, the thickness of insulating layer 58 is about 2 μm.

The same material as that of outer-ring spacer 6g, for example, bearing steel (SUJ2) is used as the metal material of substrate 51A. Carbon steel (S45C or the like) is used other than the bearing steel. These metal materials are cut to a certain size and subjected to a heat treatment, and thereafter, and a surface requiring processing accuracy is polished and lapped to be finished to have target flatness and surface roughness. For example, the flatness is set to less than or equal to 1 μm, and the surface roughness is set to less than or equal to Ra 0.1.

Then, after insulating layer 58 is formed on one surface of substrate 51A, thin film pattern (thin film resistor) 52 of which resistance changes due to the change in surface pressure and electrode 53 connected to thin film pattern 52 are formed similarly to FIG. 5, and protective layer 54 having the insulating property protecting thin film pattern 52 is further formed. Because protective layer 54 is not formed on electrode 53, the wiring can be directly connected to electrode 53.

For example, the thin film of alumina ($Al_2O_3$) or silicon dioxide ($SiO_2$) is formed as protective layer 54 by sputtering or the like. For example, the film thickness is about 2 µm.

When the material of substrate 51A is the metal material, substrate 51A is not cracked by a load, and reliability is improved. In addition, manufacture by forming thin film pattern 52 on substrate 51A made of small metal pieces is easier than manufacture by forming the thin film pattern 52 directly on the end face of outer-ring spacer 6g, and the manufacturing cost can be suppressed.

Figure 10:
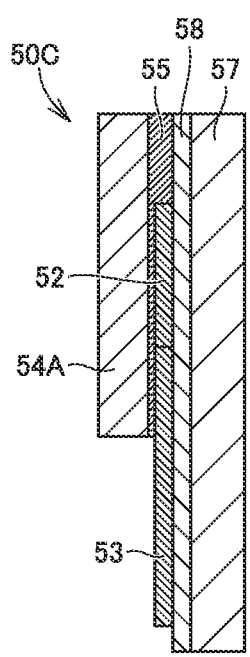
FIG. 10 is a view illustrating a third improvement example of the structure of the load sensor element that is the improvement example in FIG. 9.

FIG. 10 is a view illustrating a third improvement example of the structure of the load sensor element that is the improvement example in FIG. 9. In FIG. 9, protective layer 54 is the thin film made of the insulating material and formed by vapor deposition or sputtering, but in a load sensor element 50C of FIG. 10, for example, the plate material made of the ceramic material containing mainly zirconia ($ZrO_2$) or alumina ($Al_2O_3$) is used as protective layer 54A. Protective layer 54A is bonded and fixed so as to cover thin film pattern 52 formed on the surface of substrate 51 through adhesive layer 55 made of the adhesive. For example, the thickness of protective layer 54A is about 0.3 mm to about 5 mm, which is the same as the thickness of substrate 51.

When the plate material made of the insulating material is used as protective layer 54A, manufacturing is facilitated as compared with the film formation by sputtering or the like. In addition, the insulation from thin film pattern 52 can be further enhanced, and the load can be stably detected. In addition, because thin film pattern 52 is pressed through adhesive layer 55, adhesive layer 55 serves as a cushion layer and can uniformly press thin film pattern 52, so that load detection accuracy is improved.

As protective layer 54A, the insulating film made of the insulating material may be formed on the plate material made of the metal material, and the side on which the insulating film is formed may face the side of thin film pattern 52. In this case, cracking of protective layer 54A can be prevented.

Figure 11:
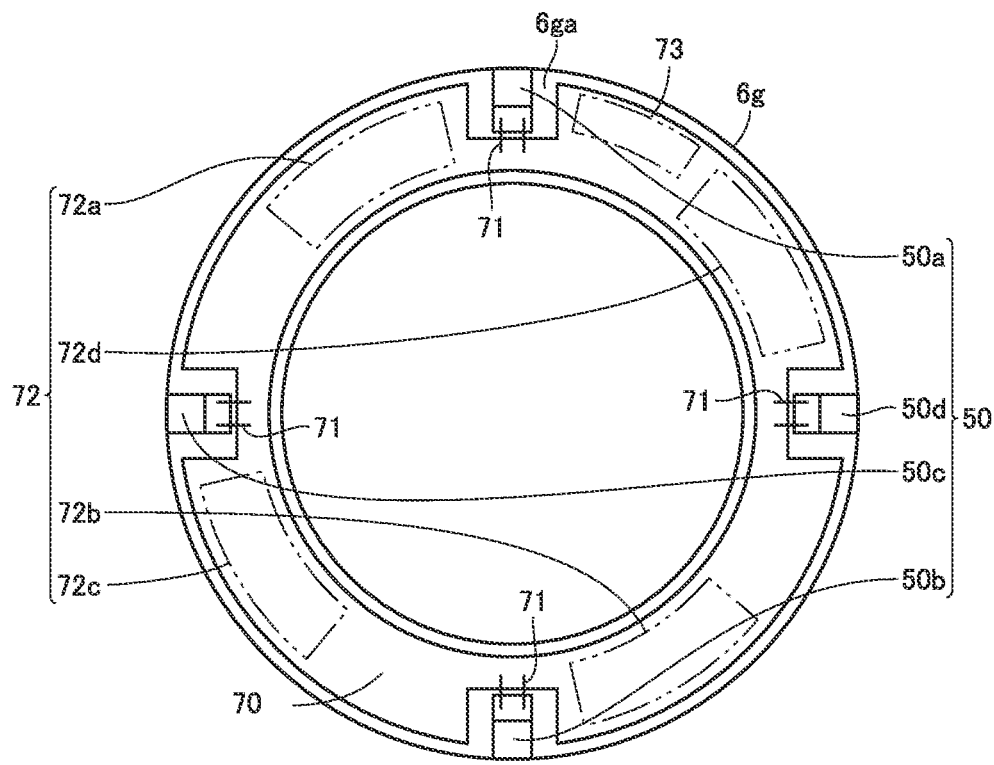
FIG. 11 is a view illustrating an example in which a processing unit that electrically processes output of the load sensor element is disposed in an outer-ring spacer.

FIG. 11 is a view illustrating an example in which a processing unit that electrically processes the output of the load sensor element is disposed in the outer-ring spacer. Load sensor element 50 (50a, 50b, 50c, 50d) fixed at equal intervals in the circumferential direction and a processing unit 70 of load sensor element 50 are fixed to one end face 6ga of outer-ring spacer 6g. For example, processing unit 70 has a shape that does not interfere with load sensor element 50, and is manufactured so as to be thinner than load sensor element 50 to prevent the contact with outer ring 5ga.

The output of load sensor element 50 is connected to processing unit 70 by wiring 71. An amplifier 72 (72a, 72b, 72c, 72d) that detects and amplifies a resistance change of load sensor element 50 (50a, 50b, 50c, 50d) is mounted on processing unit 70, and processing unit 70 obtains an output value corresponding to the resistance change. In addition, an arithmetic unit 73 may be disposed in processing unit 70. Arithmetic unit 73 may process a resistance change amount of the plurality of load sensor elements 50, convert the resistance change amount into a load applied to outer-ring spacer 6g, and output the load to the outside.

Figure 12:
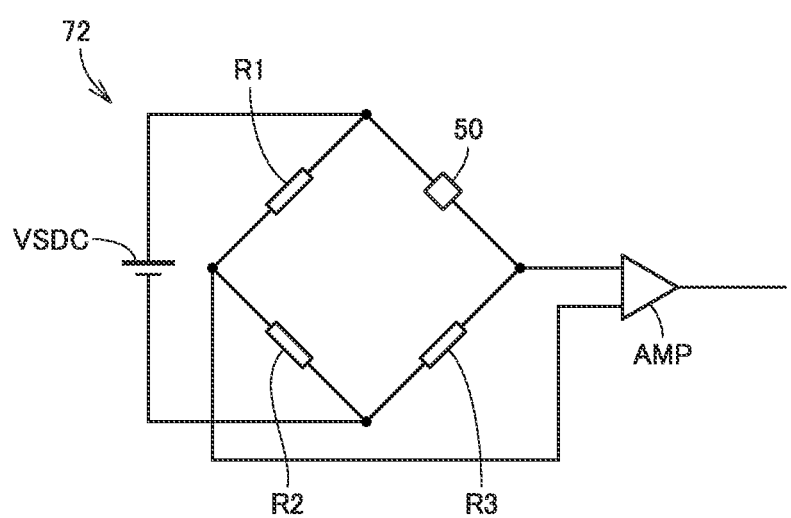
FIG. 12 is a circuit configuration diagram illustrating a configuration of an amplifier that detects a resistance change of the load sensor element.

FIG. 12 is a circuit configuration diagram illustrating a configuration of the amplifier that detects the resistance change of the load sensor element.

Amplifier 72 in FIG. 12 includes resistors R1 to R3 and load sensor element 50 that are connected to a DC power supply VSDC and a differential amplifier AMP. Resistors R1 to R3 and load sensor element 50 configure a bridge circuit. Resistor R1 and resistor R2 are connected in series between a positive electrode and a negative electrode of DC power supply VSDC. Load sensor element 50 and resistor R3 are connected in series between the positive electrode and the negative electrode of DC power supply VSDC. One input node of differential amplifier AMP is connected to a connection node between resistor R1 and resistor R2. The other input node of differential amplifier AMP is connected to the connection node between load sensor element 50 and resistor R3.

With the bridge circuit configuration as illustrated in FIG. 12, the resistance change of load sensor element 50 can be detected by differential amplifier AMP when the load changes.

The electric processing is performed near load sensor element 50 by disposing amplifier 72 as illustrated in FIG. 11, so that an electric noise can be reduced. In addition, the number of wires to be drawn to the outside can be reduced, and bearing device 30 and spindle device 1 can be easily assembled.

Figure 13:
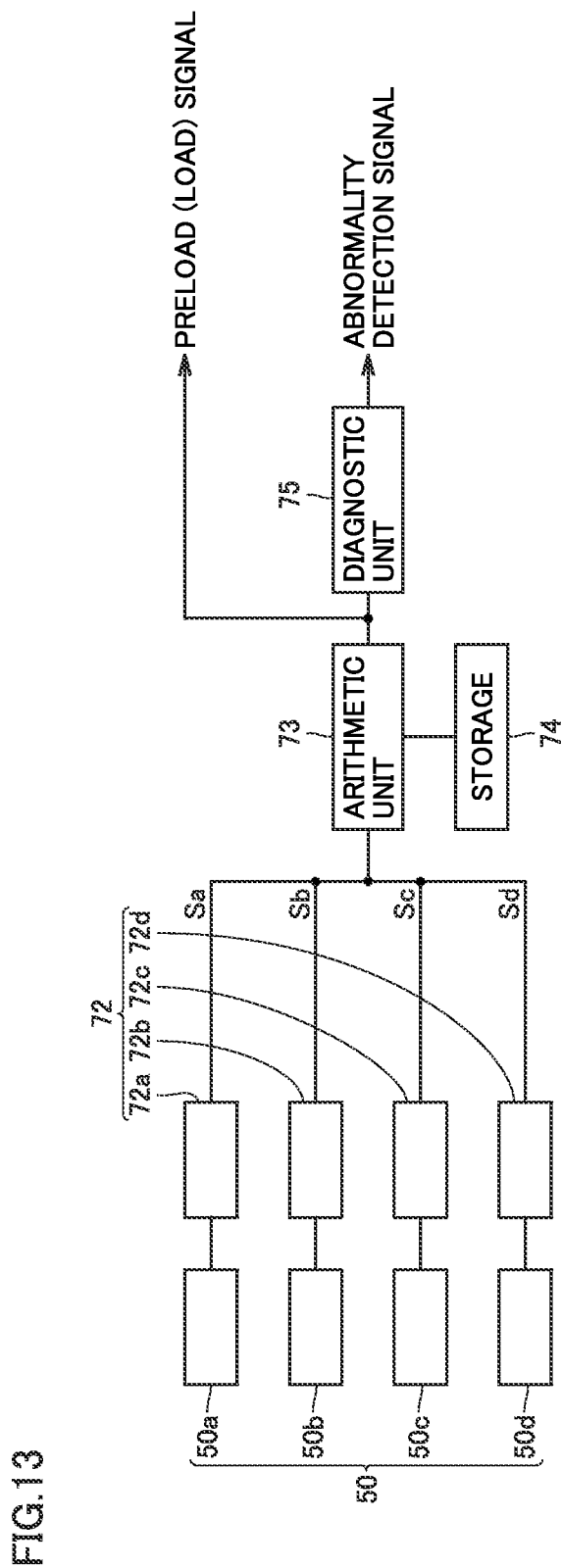
FIG. 13 is a view illustrating a configuration in which a preload (load) applied to a hearing is calculated from output of the load sensor element.

FIG. 13 is a view illustrating a configuration in which the preload (load) applied to the bearing is calculated from the output of the load sensor element. In this case, an example in which four load sensor elements are used will be described.

A calculation circuit in FIG. 13 includes arithmetic unit 73 that performs arithmetic processing on an output value (5a, 5b, 5c, 5d) of load sensor element 50 (50a, 50b, 50c, 50d) and a storage 74 that stores a relationship between the output value measured using outer-ring spacer 6g to which load sensor element 50 is fixed in advance and the load or an approximate expression. Arithmetic unit 73 calculates the load from a sensor output representative value and data of storage 74. Arithmetic unit 73 and storage 74 may be provided outside bearing device 30 or inside processing unit 70.

The preload applied to outer-ring spacer 6g is not uniform in the circumferential direction, and it is also assumed that a difference in output value depending on a detection location is generated due to the dimensional accuracy of outer-ring spacer 6g, housing 3, front lid 12, bearing 5, and the like. When main shaft 4 rotates, it is also assumed that a circumferential load distribution fluctuates due to influence of a moment load applied to main shaft 4 or movement of rolling elements Ta, Tb of bearing 5.

For this reason, a maximum value, a minimum value, a difference between the maximum value and the minimum value, and the like are set as the sensor output representative value in addition to an addition value or an average value of the output values of load sensor elements 50 (50a, 50b, 50c, 50d), and the preload (load) is calculated.

The output of the obtained preload (load) may be passed through a low-pass filter to reduce output fluctuation due to the passage of rolling elements Ta, Tb or the noise.

During the assembly of bearing device 30, fastening of a preload adjusting component, for example, nut 10, or mounting of a fixing screw of front lid 12 can be also adjusted while viewing the preload.

In addition, when bearing device 30 is mounted on spindle device 1 to rotate main shaft 4 at a high speed by motor 40, it is assumed that bearing 5 generates heat due to damage of bearing 5, the preload becomes excessive, and bearing 5 burns out. However, when the preload is calculated and monitored from load sensor element 50, an avoidance measure can be taken so as not to burn out beating 5.

For example, when the preload measured by load sensor element 50 exceeds a reference value set in advance, bearing 5 is determined to be abnormal, and measures such as lowering the rotational speed of main shaft 4, increasing the circulation amount of the cooling medium, and reducing the machining load are taken to prevent burning of bearing 5.

In addition, because load sensor element 50 is fixed to outer-ring spacer 6g located on the transmission path of the force generating the preload, the initial preload of bearing 5 (5a, 5b) can be grasped from the output of load sensor element 50 when spindle device 1 is assembled, and the fastening amount of nut 10 can be adjusted while viewing the preload amount.

Arithmetic unit 73 may calculate a moment load applied to main shaft 4 from the difference between outputs of load sensor elements 50 facing each other at 180 degrees. For example, in the arrangement of load sensor element 50 (50a, 50b, 50c, 50d) in FIG. 11, the magnitude and direction of the moment load in the vertical direction of main shaft 4 can be calculated from the difference between load sensor elements 50a, 50b. The magnitude and direction of the moment load in the left-right direction of main shall 4 can also be calculated from the difference between load sensor elements 50c, 50d. Even when the number of load sensor elements is not four, the magnitude and direction of the moment load can be calculated.

For example, when a metal workpiece is cut with a cutting tool such as an end mill fixed to the other end side of spindle device 1, the load and the load direction applied to the cutting tool can be grasped from the moment load. In addition, it is also possible to detect that the cutting tool collides with the metal workpiece from the moment load.

In order to increase the reliability of an abnormal diagnosis with an increase in the preload (load), it is also possible to comprehensively determine by further considering outputs of other sensors such as a temperature sensor, a heat flux sensor, and an acceleration sensor. For example, when the heat flux sensor is fixed to a non-rotating member (for example, outer-ring spacer 6g) near bearing 5 and disposed to face the rotating member (for example, main shaft 4), a sign of temperature rise due to the seizure of bearing 5 can be detected early.

Figure 14:
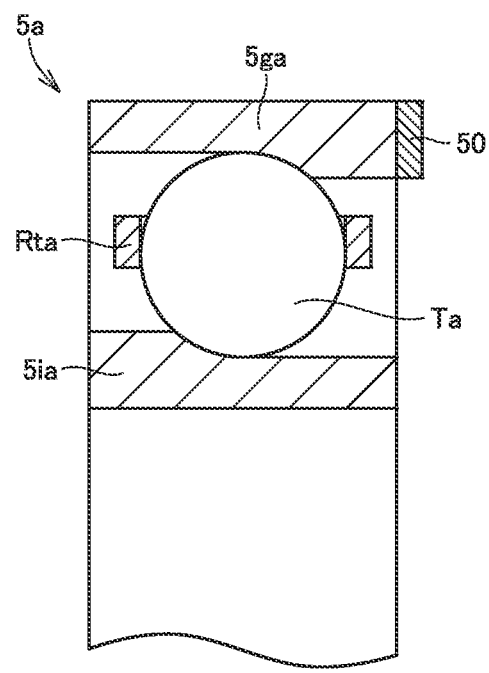
FIG. 14 is a view illustrating a modification in which a mounting position of the load sensor element is fixed to an end face of a non-rotating wheel of the bearing.

FIG. 14 is a view illustrating a modification in which the mounting position of the load sensor element is fixed to the end face of the non-rotating wheel of the bearing.

For example, load sensor element 50 is fixed to the end face of outer ring 5ga of bearing 5a by the adhesion or the like. When the plurality of load sensor elements 50 are fixed, it is desirable to fix the load sensor elements using a bonding jig (not illustrated) or the like such that the heights of the load sensor elements become uniform. Even in this structure, processing unit 70 may be provided on the end face of outer ring 5ga. In this case, processing unit 70 is preferably mounted integrally with a fixed ring (outer ring 5ga).

Load sensor element 50 is fixed to the end face of bearing 5, so that a load detection unit can be compactly mounted.

Figure 15:
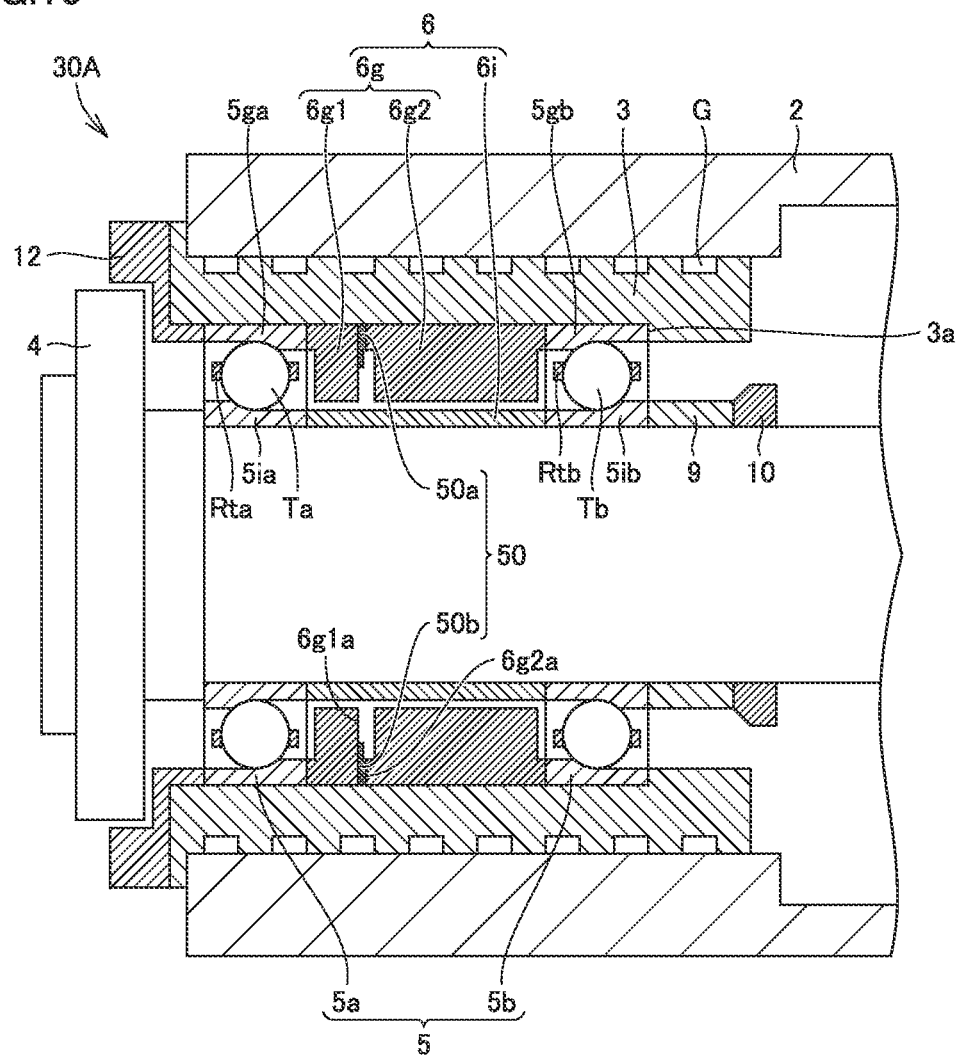
FIG. 15 is a view illustrating a modification in which a fixed position of the load sensor element is changed.

FIG. 15 is a view illustrating a modification in which the fixed position of the load sensor element is changed. In FIG. 15, load sensor element 50 is fixed to an end face 6g1a of one outer-ring spacer 6g1 obtained by dividing outer-ring spacer 6g into two in the axial direction, and an end face 6g2a of the other outer-ring spacer 6g2 abuts on load sensor element 50.

Because the side view in which load sensor element 50 is mounted is the same as that in FIG. 3, 4, or 11, the description thereof is omitted.

End face 6g1a of outer-ring spacer 6g1 to which load sensor element 50 is fixed and end face 6g2a of outer-ring spacer 6g2 that presses load sensor element 50 need to be processed such that flatness and surface roughness and the parallelism of these end faces 6g1a, 6g2a are less than or equal to reference values, and each of outer-ring spacers 6g1, 6g2 can be processed with high accuracy.

In end face 6g2a of outer-ring spacer 6g2, a convex surface (not illustrated) may be provided such that the convex surface and load sensor element 50 abut on each other. In addition, in end face 6g1a of outer-ring spacer 6g1, the convex surface (not illustrated) may be provided, and load sensor element 50 may be fixed to the convex surface.

Furthermore, outer-ring spacers 6g1, 6g2 divided into two may be aligned by pins (not illustrated) so as not to be separated.

In this case, the area for which the machining accuracy is required can be reduced, so that the machining time can be shortened while the machining is facilitated.

Alternatively, an intermediate layer (cushion layer) (not illustrated) may be inserted between load sensor element 50 and end face 6g2a of outer-ring spacer 6g2 to press load sensor element 50.

For example, a coating thin film of a metal material (for example, aluminum, copper, or a metal alloy) having lower rigidity (longitudinal elastic modulus) than the material of outer-ring spacer 6g, a resin material (for example, a fluorine-based resin), or the like can be used as the material of the intermediate layer.

The intermediate layer is deformed by the pressing through the intermediate layer having lower rigidity than outer-ring spacer 6g, and load sensor element 50 can be uniformly and stably pressed.

In addition, with the configuration in which load sensor element 50 is pressed through the intermediate layer, the processing accuracy (surface roughness, flatness, and the like) of the end face of outer-ring spacer 6g can be reduced as compared with the case where the intermediate layer is not used, and the processing is facilitated.

Load sensor element 50 and processing unit 70 or a part of processing unit 70 may be integrally mounted.

Figure 16:
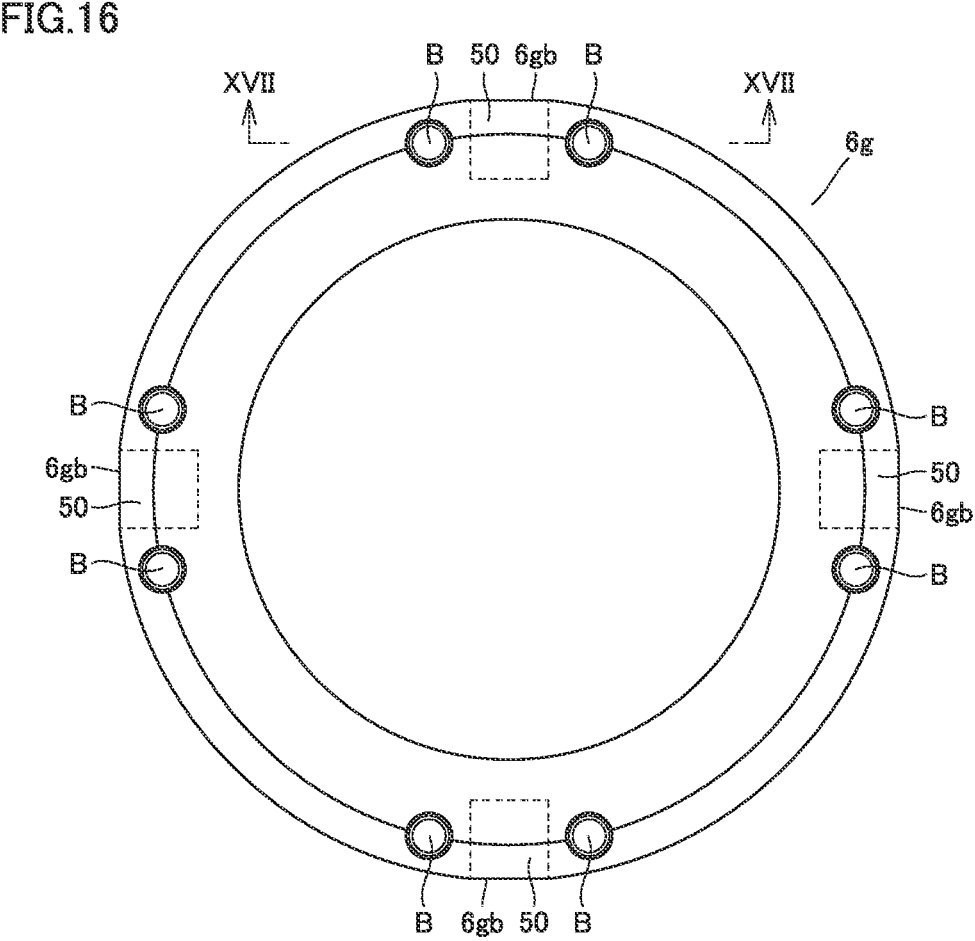
FIG. 16 is a side view illustrating a modification in which a method for fixing the load sensor element is changed.
Figure 17:
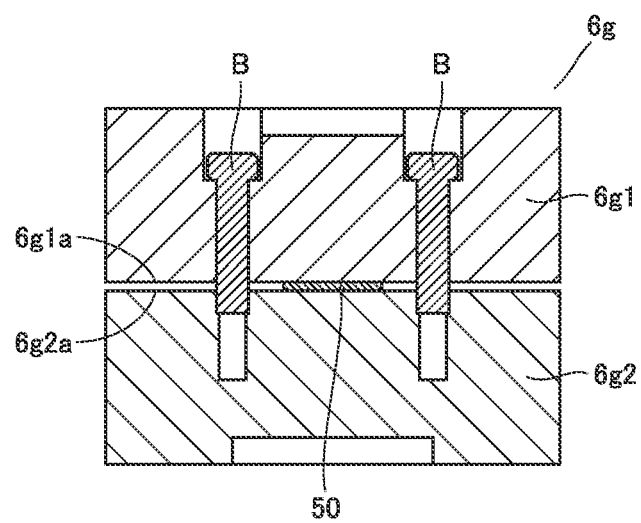
FIG. 17 is an arrow view of a section taken along a line XVII-XVII in FIG. 16.

FIG. 16 is a side view illustrating a modification in which a method for fixing the load sensor element is changed. FIG. 17 is an arrow view of a section taken along a line XVII-XVII in FIG. 16.

Load sensor element 50 is disposed between the two divided outer-ring spacers 6g1, 6g2, and the preload is applied to load sensor element 50 by fastening outer-ring spacers 6g1, 6g2 with a screw B. Although load sensor element 50 can be fixed without applying the adhesive to the contact surfaces of outer-ring spacers 6g1, 6g2 and load sensor element 50, the adhesive may be used in combination.

End faces 6g1a, 6g2a of outer-ring spacers 6g1, 6g2 on which load sensor element 50 abuts have a structure in which protrusions are not provided on end faces 6g1a, 6g2a to easily obtain surface accuracy by flat grinding such that the processing can be performed with high accuracy in surface roughness and flatness.

When being provided on the outer diameter surface of outer-ring spacer 6g, a planarizing portion 6gb can be used as a mark of the arrangement position of load sensor element 50.

When the preload is applied to load sensor element 50, a dead zone is eliminated in the output of load sensor element 50, and the reduction of hysteresis and the improvement of linearity can be expected.

Figure 18:
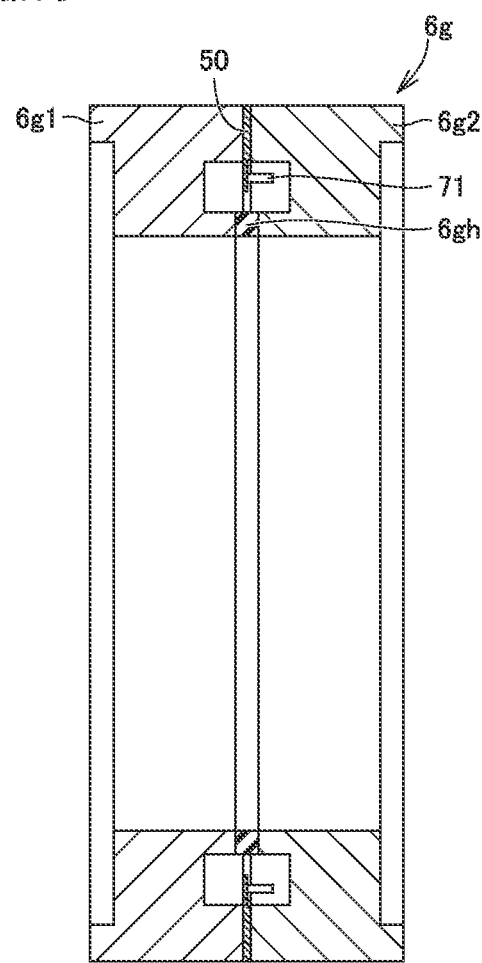
FIG. 18 is a sectional view illustrating an outer-ring spacer as an improvement example in FIG. 16.

FIG. 18 is a sectional view illustrating the outer-ring spacer as an improvement example of FIG. 16.

When bearing 5 for air-oil lubrication is used, a nozzle for air oil is processed in outer-ring spacer 6g, and the air oil is injected from the nozzle toward bearing 5. An oil seal member 6gh may be disposed between outer-ring spacers 6g1, 6g2 such that the air oil does not leak from a gap of divided inter-outer-ring spacer 6g to the side of wiring 71. Oil seal member 6gh may be made of a metal material. However, preferably oil seal member 6gh is made of a resin material so as to be able to be pressed and deformed at outer-ring spacers 6g1, 6g2 to prevent the formation of the gap.

When load sensor element 50 is sandwiched between two divided outer-ring spacers 6g1, 6g2 and fastened with screw B, a jig (not illustrated) is preferably used when it is difficult to align outer-ring spacers 6g1, 6g2. For example, when outer-ring spacer 6g is inserted into the cylindrical jig inner diameter portion to perform the assembly, the centering is easy.

Figure 19:
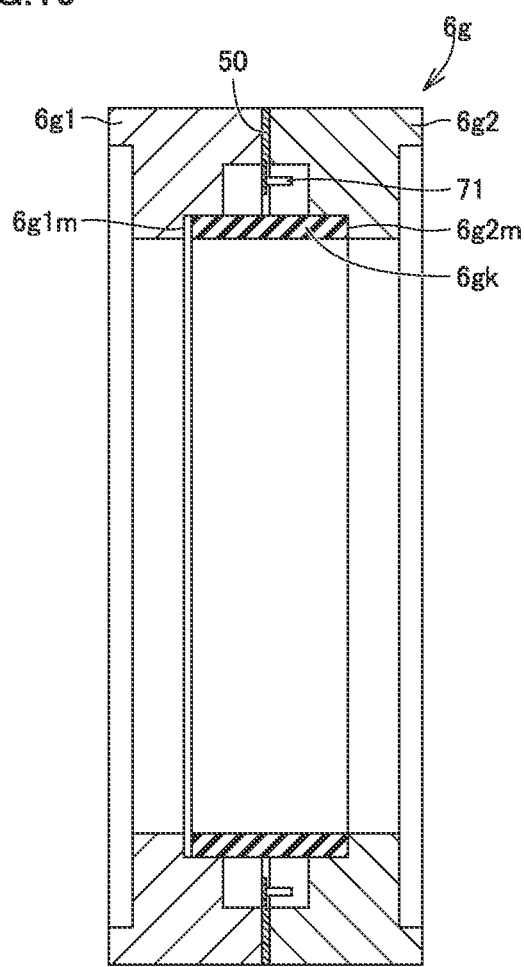
FIG. 19 is a sectional view illustrating an outer-ring spacer that is an improvement example in FIG. 18.

FIG. 19 is a sectional view illustrating the outer-ring spacer as an improvement example of FIG. 18.

As illustrated in FIG. 19, steps 6g1m, 6g2m are provided in the inner diameter portions of outer-ring spacers 6g1, 6g2, and an oil seal member 6gk is disposed so as to be fitted to the steps.

Oil seal member 6gk enables alignment of outer-ring spacer 6g1, 6g2, and the jig can be omitted.

Figure 20:
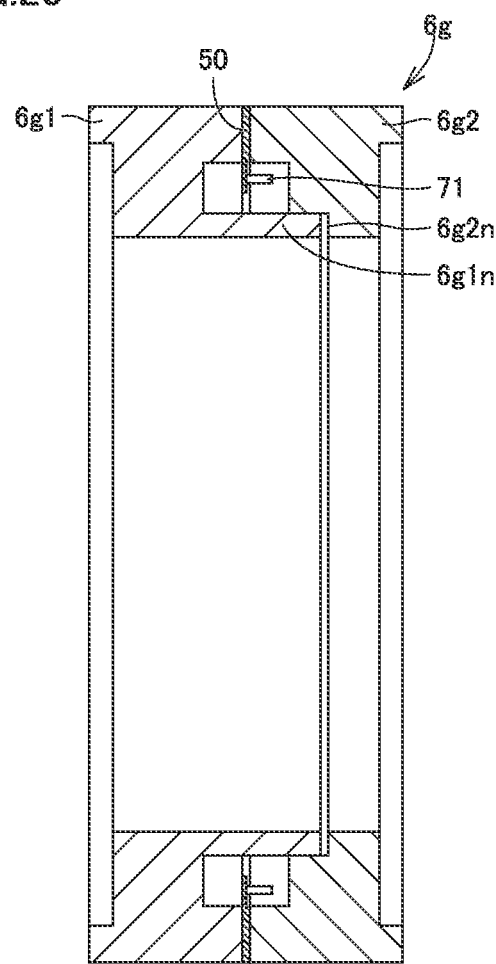
FIG. 20 is a sectional view illustrating an outer-ring spacer that is an improvement example in FIG. 19.

FIG. 20 is a sectional view illustrating the outer-ring spacer as an improvement example of FIG. 19.

As illustrated in FIG. 20, a flange 6g1n is provided on the inner diameter side of outer-ring spacer 6g1, a step 6g2n into which flange 6g1n is fitted is provided on the inner diameter surface of the other outer-ring spacer 6g2, and flange 6g1n and step 6g2n are fitted. Thus, the alignment of outer-ring spacer 6g1, 6g2 can be performed. In addition, leakage of the air oil can be prevented to have a sealing function.

In this structure, the oil seal member is not required, the number of components can be reduced, and assemblability is improved.

As described in the above embodiment, in the bearing device of the embodiment, load sensor element 50 (pressure-sensitive sensor element) is disposed on outer-ring spacer 6g on the load path in which the preload (load) is applied to the bearing or on the end face of bearing 5. Load sensor element 50 (pressure-sensitive sensor element) on which the thin film resistor capable of measuring the load is formed is fixed by the adhesion or the like in the circumferential direction of outer-ring spacer 6g, and load sensor element 50 has a structure in which the pressing is performed through the member abutting on load sensor element 50. Thus, the manufacturing can be simplified as compared with the case where the thin film sensor that detects the load is directly formed on the metal component such as the outer-ring spacer.

(Summary)

Finally, the embodiment will be summarized again with reference to the drawings.

The present disclosure relates to bearing device 30. Bearing device 30 includes at least one bearing 5 including the rolling element and the raceway surface to support main shaft 4, the member (6 or 5ga) disposed on the path through which the pressing force generating the preload is transmitted between the rolling element and the raceway surface, and at least one load sensor element 50 fixed to the member (6 or 5ga) to be capable of measuring the pressing force. At least one load sensor element 50 is a chip component including thin film pattern 52 of which resistance changes according to the pressing force and protective layer 54 that insulates and protects thin film pattern 52.

Load sensor element 50 is small in size, and the plurality of load sensor elements 50 can be stably manufactured at once. For this reason, the manufacturing can be simplified as compared with the case where the thin film sensor that detects the load is directly formed on the metal component such as the outer-ring spacer. Consequently, the improvement in reliability and the reduction in manufacturing cost can be expected.

Preferably, the pressing force is applied by the load in the direction along main shaft 4. As illustrated in FIG. 3 or 4, at least one load sensor element 50 is the plurality of load sensor elements 50a, 50b, 50c, 50d arranged at equal intervals on the same circumference in the plane intersecting the direction along main shaft 4.

As described above, the plurality of load sensor elements 50a, 50b, 50c, 50d are dispersedly arranged, so that the chip component is easily adopted as the load sensor element.

More preferably, the bearing device further includes arithmetic unit 73 that calculates the magnitude and direction of the moment load in the direction orthogonal to main shaft 4 using the outputs of the plurality of load sensor elements 50a to 50d.

For example, the magnitude and direction of the load applied to the cutting tool during machining of the workpiece with the cutting tool such as an end mill can be grasped with such a configuration.

Preferably, as illustrated in FIGS. 1 and 2, at least one bearing 5 is the plurality of bearings 5a, 5b. The member to which load sensor element 50 is fixed is non-rotation-side outer-ring spacer 6g inserted between two bearings 5a, 5b among the plurality of bearings. At least one load sensor element 50 is fixed to end face 6ga of the spacer, and abuts on the fixed ring (outer ring 5ga) of one of two bearings 5a, 5b to transmit the pressing force.

The structure in which the spacer is arranged between the plurality of bearings is common for the spindle devices. Thus, the bearing device of the embodiment is easily applied to the spindle device.

Preferably, as illustrated in FIG. 14, the member to which load sensor element 50 is fixed is the fixed ring (outer ring 5ga) of at least one bearing. At least one load sensor element 50 is fixed to the end face of the fixed ring (outer ring 5ga) and abuts on the end face of spacer 6 disposed adjacent to the fixed ring (outer ring 5ga) to transmit the pressing force.

In this manner, the load sensor element may be fixed to the bearing side instead of the spacer. Load sensor element 50 is fixed to the end face of bearing 5, so that the load detection unit can be compactly mounted.

Preferably, the member to which load sensor element 50 is fixed is first spacer 6g1 obtained by dividing spacer 6 disposed adjacent to at least one bearing into first spacer 6g1 and second spacer 6g2. At least One load sensor element 50 is fixed to the end face of first spacer 6g1 and abuts on the end face of second spacer 6g2 to transmit the pressing force.

As described above, when the spacer is divided into two to sandwich load sensor element 50 therebetween, the spacer can be carried while load sensor element 50 is set in the spacer at a manufacturing stage.

Preferably, as illustrated in FIG. 11, bearing device 30 further includes processing unit 70 that is disposed near at least one load sensor element 50 to process the output of at least one load sensor element 50. Processing unit 70 includes amplifier 72 that detects and amplifies the resistance change of at least one load sensor element 50.

Preferably, bearing device 30 further includes processing unit 70 that is disposed near at least one load sensor element to process the output of at least one load sensor element 50. As illustrated in FIG. 13, at least one load sensor element 50 is the plurality of load sensor elements 50*a* to 50*d*. Processing unit 70 includes the plurality of amplifiers 72*a* to 72*d* that process outputs of the plurality of load sensor elements 50*a* to 50*d*, arithmetic unit 73, and storage 74. Arithmetic unit 73 calculates the load from the sensor output representative value including at least one of the addition value, the average value, the maximum value, the minimum value, and the difference between the maximum value and the minimum value of the output values obtained by the plurality of amplifiers 72*a* to 72*d*, the relationship between the load stored in advance in storage 74 and the sensor output representative value, or the approximate expression of the relationship.

Preferably, as illustrated in FIGS. 16 and 17, the member to which load sensor element 50 is fixed is any one of first outer-ring spacer 6*g*1 and second outer-ring spacer 6*g*2 in which the spacer disposed adjacent to at least one bearing is divided into two. First outer-ring spacer 6*g*1 and second outer-ring spacer 6*g*2 sandwich at least one load sensor element 50. First outer-ring spacer 6*g*1 and second outer-ring spacer 6*g*2 are fastened by screw B, and the pressing force by the fastening force of screw B is applied in advance to at least one load sensor element 50.

When the preload is applied to load sensor element 50, the dead zone is eliminated in the output of load sensor element 50, and the reduction of hysteresis and the improvement of linearity can be expected.

Preferably, as illustrated in FIGS. 16 and 17, the member to which load sensor element 50 is fixed is any one of first outer-ring spacer 6*g*1 and second outer-ring spacer 6*g*2 in which the spacer disposed adjacent to at least one bearing is divided into two. First outer-ring spacer 6*g*1 and second outer-ring spacer 6*g*2 sandwich at least one load sensor element 50. End faces 6*g*1*a*, 6*g*2*a*, which are sandwiching surfaces sandwiching at least one load sensor element 50 of first outer-ring spacer 6*g*1 and second outer-ring spacer 6*g*2, are flat surfaces without protrusions.

Because the end face is the flat surface without the protrusion as described above, the surface, accuracy can be easily obtained by flat grinding, and the processing with high accuracy of surface roughness and accuracy of flatness can be performed on the installation surface and the abutment surface of load sensor element 50.

More preferably, as illustrated in FIGS. 18 and 19, bearing device 30 further includes oil seal members 6*gh*, 6*gk* disposed between first outer-ring spacer 6*g*1 and second outer-ring spacer 6*g*2 of the spacer.

Preferably, as illustrated in FIG. 20, the member to which load sensor element 50 is fixed is any one of first spacer 6*g*1 and second spacer 6*g*2 in which the spacer disposed adjacent to at least one bearing is divided into two. First spacer 6*g*1 and second spacer 6*g*2 sandwich at least one load sensor element 50. Flange 6*g*1*n*, which is a convex portion in which the position of second spacer 6*g*2 is limited, is formed in first spacer 6*g*1. Flange 6*g*1*n* is fitted into step 6*g*2*n*, which is a concave portion of second spacer 6*g*2, to regulate the position of second spacer 6*g*2.

Thus, the alignment of outer-ring spacer 6*g*1, 6*g*2 cart be performed. In addition, the leakage of the air oil can be prevented to have the sealing function. In this structure, the oil seal member is not required, the number of components can be reduced, and the assemblability is improved.

In another aspect, the present disclosure relates to spindle device 1 including bearing device 30 described in any one of the above, In still another aspect, the present disclosure relates to bearing 5*a*. As illustrated in FIG. 14, bearing 5*a* includes rolling element Ta, inner ring 5*ia*, outer ring 5*ga*, and at least one load sensor element 50 that is disposed on the end face of the fixed ring (outer ring 5*ga*) in inner ring 5*ia* and outer ring 5*ga* to be capable of measuring the pressing force generating the preload between rolling element Ta and the raceway surface of the fixed ring. As illustrated in FIG. 6 and the like, at least one load sensor element 50 is a chip component including thin film pattern 52 of which resistance changes according to the pressing force and protective layer 54 that insulates and protects thin film pattern 52.

Preferably, bearing 5*a* further includes processing unit 70 that processes the output of the at least one load sensor element. Processing unit 70 is integrally mounted on the fixed ring (outer ring 5*ga*).

In still another aspect, the present disclosure relates to spacer 6 disposed adjacent to bearing 5 including the rolling element and die raceway surface. Spacer 6 includes outer-ring spacer fig that is the member to which the pressing force generating the preload between the rolling element and the raceway surface is transmitted, and at least one load sensor element 50 that is fixed to outer-ring spacer 6*g* to be capable of measuring the pressing force. As illustrated in FIGS. 5 to 10, at least one load sensor element 50 is the chip component including thin film pattern 52 of which resistance changes according to the pressing force and protective layer 54 that insulates and protects thin film pattern 52.

Preferably, as illustrated in FIG. 11, spacer 6 further includes processing unit 70 that is integrally mounted on the member, to which the pressing force generating the preload is transmitted, to process the output of at least one load sensor element 50.

Preferably, as illustrated in FIG. 15, the member to which load sensor element 50 is fixed is first spacer 6*g*1 obtained by dividing outer-ring spacer 6*g* into first spacer 6*g*1 and second spacer 6*g*2. At least one load sensor element 50 is fixed to end face of first spacer 6*g*1, and abuts on end face 6*g*2*a* of second spacer 6*g*2 to transmit the pressing force.

Preferably, as illustrated in FIGS. 16 and 17, first spacer 6*g*1 and second spacer 6*g*2 sandwich at least one load sensor element 50. First spacer 6*g*1 and second spacer 6*g*2 are fastened by screw B. The pressing force by fastening force of screw B is applied in advance to at least one load sensor element 50.

More preferably, as illustrated in FIGS. 18 and 19, outer-ring spacer fig further includes oil seal members 6*gh*, 6*gk* disposed between first spacer 6*g*1 and second spacer 6*g*2.

More preferably, as illustrated in FIG. 19, the step that enables the alignment of first spacer 6*g*1 and second spacer 6*g*2 is formed on the inner diameter portion side of first spacer 6*g*1 and second spacer 6*g*2 by fitting with oil seal member 6*gk*.

With such a configuration, outer-ring spacers 6*g*1, 6*g*2 can be aligned by oil seal member 6*gk*, and the jig for aligning outer-ring spacers 6*g*1, 6*g*2 can be omitted.

It should be considered that the disclosed embodiment is an example in all respects and not restrictive. The scope of the present invention is defined by not the description of the embodiment, but the claims, and it is intended that all changes within the meaning and scope of the claims are included in the present invention.

REFERENCE SIGNS LIST

1: spindle device, 2: outer cylinder, 3: housing, 3a, 6g2n: step, 4: main shaft, 5, 5a, 5b, 16: bearing, 5ga, 5gb, 16b: outer ring, 5ia, 5ib, 16a: inner ring, 6, 9: spacer, 6g, 6g1, 6g2: outer-ring spacer, 6g1a, 6g2a, 6ga: end face, 6g1m, 6g2m: step, 6g1n: flange, 6gb: planarizing portion, 6gh, 6gk: oil seal member, 6i: inner-ring spacer, 10, 20: nut, 12: front lid, 13: stator, 14: rotor, 15: cylindrical member, 17: end member, 18, 21: positioning member, 19: inner-ring retainer, 22: space portion, 27, 73: arithmetic unit, 28, 74: storage, 30: bearing device, 40: motor, 50, 50A, 50B, 50a, 50b, 50c, 50d: load sensor element, 51, 51A: substrate, 52: thin film pattern, 53: electrode, 54, 54A: protective layer, 55: adhesive layer, 58: insulating layer, 70: processing unit, 71: wiring, 72, 72a, 72d: amplifier, AMP: differential amplifier, B: screw, G: cooling medium passage, R1, R2, R3: resistor, Rta, Rtb: retainer, Ta, Tb: rolling element, VSDC: power supply

The invention claimed is:

1. A bearing device comprising:
at least one bearing that includes a rolling element, a fixed ring, and a raceway surface to support a shaft;
a first spacer and a second spacer both of which are disposed on a path through which a pressing force generating a preload between the rolling element and the raceway surface is transmitted; and
at least one load sensor element that is fixed to the first spacer and abuts on the second spacer to measure the pressing force, wherein
the at least one load sensor element is sandwiched by the first spacer and the second spacer such that the at least one load sensor element is contiguous with i) the first spacer and ii) the second spacer,
the at least one load sensor element includes i) a pressure-sensitive sensor of which resistance changes according to the pressing force and ii) a protective layer that insulates and protects the pressure-sensitive sensor,
the first spacer and the second spacer are obtained by dividing a spacer disposed adjacent to the at least one bearing into two,
the first spacer and the second spacer are fastened by a screw, and
pressing force caused by fastening force of the screw is applied in advance to the at least one load sensor element.

2. The bearing device according to claim 1, wherein
the pressing force is applied by a load in a direction along the shaft, and
the at least one load sensor element is a plurality of load sensor elements arranged at equal intervals on a circumference in a plane intersecting the direction along the shaft.

3. The bearing device according to claim 2, further comprising an arithmetic unit that calculates magnitude and a direction of a moment load in a direction orthogonal to the shaft, using outputs of the plurality of load sensor elements.

4. The bearing device according to claim 1, wherein
the at least one bearing is a plurality of bearings, and
the first spacer is a non-rotating-side spacer inserted between two bearings among the plurality of bearings.

5. The bearing device according to claim 1, wherein
the first spacer is a first outer-ring spacer and the second spacer is a second outer-ring spacer, and
the at least one load sensor element abuts on an end face of the first outer-ring spacer and abuts on an end face of the second outer-ring spacer to transmit the pressing force.

6. The bearing device according to claim 1, further comprising a processing unit that is disposed by the at least one load sensor element to process output of the at least one load sensor element, wherein
the processing unit includes an amplifier that detects and amplifies a resistance change of the at least one load sensor element.

7. The bearing device according to claim 1, further comprising a processing unit that is disposed by the at least one load sensor element to process output of the at least one load sensor element, wherein
the at least one load sensor element is a plurality of load sensor elements,
the processing unit includes
a plurality of amplifiers that process outputs of the plurality of load sensor elements,
an arithmetic unit, and
a storage, and
the arithmetic unit calculates a load from a sensor output representative value including at least one of an addition value, an average value, a maximum value, a minimum value, and a difference between the maximum value and the minimum value of output values obtained by the plurality of amplifiers; a relationship between a load stored in advance in the storage and the sensor output representative value; or an approximate expression of the relationship.

8. The bearing device according to claim 1, wherein
the first spacer includes a flange that abuts on the second spacer to fix a position of the second spacer.

9. A spindle device comprising the bearing device according to claim 1.

10. A bearing comprising:
a rolling element;
an inner ring;
an outer ring;
a first spacer;
a second spacer; and
at least one load sensor element that is fixed to the first spacer and abuts on the second spacer to measure pressing force generating a preload between the rolling element and a raceway surface of the bearing, wherein
the at least one load sensor element includes i) a pressure-sensitive sensor of which resistance changes according to the pressing force and ii) a protective layer that insulates and protects the pressure-sensitive sensor,
the first spacer and the second spacer are obtained by dividing a spacer into two,
the first spacer and the second spacer sandwich the at least one load sensor element such that the at least one load sensor element is contiguous with i) the first spacer and ii) the second spacer,
the first spacer and the second spacer are fastened by a screw, and
pressing force caused by fastening force of the screw is applied in advance to the at least one load sensor element.

11. The bearing according to claim 10, further comprising a processing unit that processes output of the at least one load sensor element, wherein the processing unit is integrally mounted on the bearing.

12. A spacer disposed adjacent to a bearing including a rolling element, a fixed ring, and a raceway surface, the spacer comprising:

a first spacer and a second spacer to which pressing force generating a preload between the rolling element and the raceway surface is transmitted; and at least one load sensor element that is fixed to the first spacer and abuts on the second spacer to measure the pressing force, wherein the at least one load sensor element includes i) a pressure-sensitive sensor of which resistance changes according to the pressing force and a protective layer that insulates and protects the pressure-sensitive sensor, the first spacer and the second spacer are obtained by dividing the spacer into two, the first spacer and the second spacer sandwich the at least one load sensor element such that the at least one load sensor element is contiguous with i) the first spacer and ii) the second spacer, the first spacer and the second spacer are fastened by a screw, and pressing force caused by fastening force of the screw is applied in advance to the at least one load sensor element.

* * * * *